United States Patent [19]

Setchell et al.

[11] Patent Number: 4,936,778
[45] Date of Patent: Jun. 26, 1990

[54] METHOD AND APPARATUS FOR PRODUCING COMPARATIVE DATA

[75] Inventors: Anthony P. Setchell; David L. Stone, both of Geneva; Michael G. Horner, Bernex, all of Switzerland

[73] Assignee: Digital Equipment International Limited, Geneva, Switzerland

[21] Appl. No.: 863,061

[22] Filed: May 14, 1986

[51] Int. Cl.$^5$ .............................................. G09B 19/02
[52] U.S. Cl. .................................................. 434/107
[58] Field of Search ............... 434/107, 109, 146, 207, 434/269, 405, 430, 427

[56] References Cited

U.S. PATENT DOCUMENTS

| 396,381 | 1/1889 | Yaggy | 434/269 |
| 635,596 | 10/1899 | Herman | 434/107 |
| 1,461,710 | 7/1923 | Brinton | 434/107 X |
| 2,167,131 | 7/1939 | Weidenborner | 434/405 |
| 2,924,895 | 2/1960 | Bachi | 434/430 |
| 2,925,668 | 2/1960 | Forest | 434/107 |
| 3,719,801 | 3/1973 | Drexler | 235/487 |
| 3,855,714 | 12/1974 | Block | 434/269 |
| 4,096,644 | 6/1978 | Nesher | 434/207 |
| 4,511,161 | 4/1985 | Gruner | 283/1 A |

Primary Examiner—David A. Scherbel
Assistant Examiner—Michele A. Van Patten
Attorney, Agent, or Firm—Finnegan, Henderson, Farabow, Garrett, and Dunner

[57] ABSTRACT

A method and apparatus is disclosed for producing comparative data in a visually assimilable form. The method comprises providing a substrate which is divided into visually distinct zones each representative of a different area of comparison, providing first means over said substrate aligned with at least one said zone and visually indicative of first data relative to said at least one zone, and providing second means over said first means aligned with at least one said zone and visually indicative of second data relevant to said at least one zone, said second means being visually different to said first means. Said first and second means where they coincide in a said zone combine to provide third means visually different to said first and second means, whereby to provide an immediate visual comparison between the data represented by said first and second means for each of said zones.

2 Claims, 1 Drawing Sheet

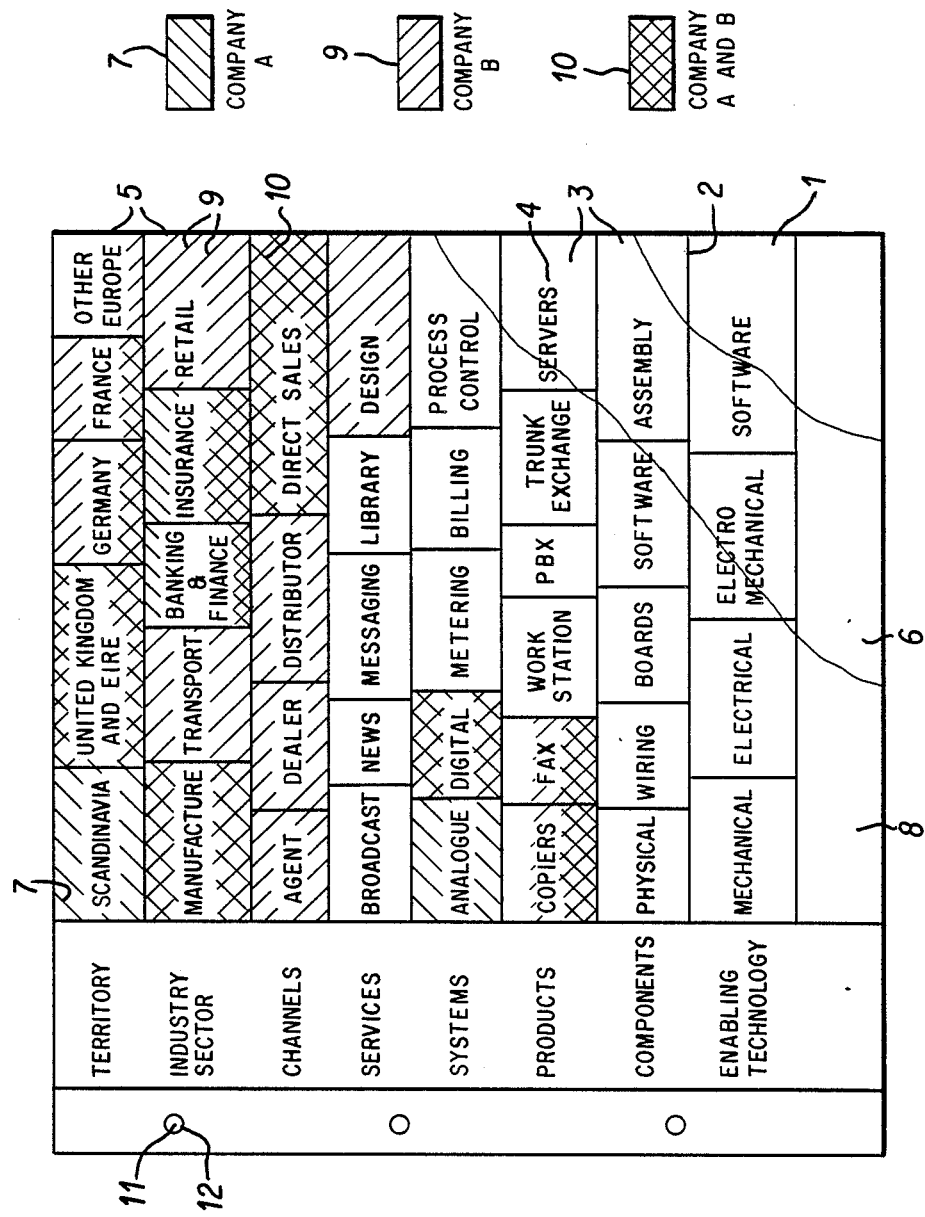

METHOD AND APPARATUS FOR PRODUCING COMPARATIVE DATA

This invention relates to a method of and apparatus for producing comparative data.

There is frequently a need to compare data, e.g., to enable decisions to be made. For example, it may be desirable to compare data relating to the products and services, markets, market share, geographical spread, and the like of one company in comparison with one or more competitor companies. At the present time the only tool for making such comparisons in a visual form are graphs and these are limited both in their use and application.

The present invention has as its object to provide a method of and apparatus for producing comparative data in a visually assimilable form.

The present invention provides a method of producing comparative data in a visually assimilable form comprising the steps of:
  providing a substrate which is divided into visually distinct zones each representative of a different area of comparison,
  providing first means over said substrate aligned with at least one said zone and visually indicative of first data relevant to said at least one zone, and
  providing second means over said first means aligned with at least one said zone and visually indicative of second data relevant to said at least one zone, said second means being visually different to said first means,
  said first and second means where they coincide in a said zone combining to provide third means visually different to said first and second means,
  whereby to provide an immediate visual comparison between the data represented by said first and second means for each of said zones.

The invention also provides apparatus for producing comparative data in a visually assimilable form comprising:
  a substrate divided into visually distinct zones each representative of a different area of comparison,
  first means over said substrate aligned with at least one said zone and visually indicative of first data relevant to said at least one zone, and
  second means over said first means aligned with at least one said zone and visually indicative of second data relevant to said at least one zone, said second means being visually different to said first means,
  said first and second means where they coincide in a said zone combining to provide third means visually different to said first and second means,
  whereby to provide an immediate visual comparison between the data represented by said first and second means for each of said zones.

Said zones may be arranged in a grid pattern and may each have an identifying marking thereon. The zones may be sized according to their relative significance.

Said first means may comprise first markings on a first transparent carrier which can be overlayed over said substrate and said second means may comprise second markings on a second transparent carrier which can be overlayed over said first carrier. Means, such as pegs, pins or the like engageable with apertures in said first and second carriers may be provided for properly aligning the first and second carriers with said substrate.

Said first and second means may be such that said identifying zone markings are visible therethrough.

Said first and second markings may comprise different colour markings, e.g., different translucent colour markings to enable said zones to be viewed therethrough. The colours for said first and second markings may be selected from the group comprising additive colours and subtractive colours, whereby said first and second colour markings will combine to provide said third means of a third colour.

Said first means and said second means may occupy the whole or a part of each relevant zone in proportion to the relevance of the first data and the second data to each zone.

The invention will be more particularly described with reference to the accompanying diagrammatic drawing which illustrates the method and apparatus of the present invention and which has parts cut away at the bottom right to illustrate the different components.

Referring to the drawing it will be seen that the apparatus illustrated therein comprises a substrate 1 which is divided by lines 2 into visually distinct zones 3 each representative of a different area of comparison and each of which contains an identifying marking 4. The zones 3 are arranged in a grid pattern to provide lines of zones 5 which in the illustrative embodiment are representative of territory, industry sector, channels, etc., as indicated down the left side. The different zones 3 in each line 5 then indicate sub-divisions within each broad heading such as particular territories and particular industry sectors.

Overlayed over the substrate 1 is a first transparent carrier 6 carrying markings 7 representing data relative to a first Company A. Overlayed over the first carrier 6 is a second transparent carrier 8 carrying markings 9 representative of data relevant to a second Company B. The first and second markings 9 are aligned with the relevant zones 3 and represent the activities of the Companies A and B in each zone represented by a zone 3. Where companies A and B are both involved in a particular area then the first and second markings 7 and 9 combine to provide third markings 10 which are visually distinct from the first and second markings 7 and 9. In the illustrative embodiment the first, second and third markings 7, 9 and 10 comprise different forms of cross-hatching although in practice the first and second markings would preferably comprise different translucent additive or subtractive colours which combined to provide a third translucent colour where they coincided so that the identifying zone markings 4 are visible therethrough.

The carriers 6 and 8 are maintained in alignment with the substrate 1 and with one another by means of pegs or pins 11 which project outwardly of the substrate 1 and engage apertures 12 in the margins of the carriers 6 and 8.

The first and second markings 7 and 9 can not only indicate the involvement of the companies A and B in each of the areas corresponding to the zones 3 but can indicate the extent of that involvement by the proportion of each zone 3 covered by the first or second markings 7 and 9. For example, looking along the line of zones 3 headed PRODUCTS it will be seen that in the zones marked COPIERS and FAX the markings 7 indicate that Company A has about 25% of the market whilst the markings 9 indicate that Company B have about 75% of the market. Other areas of comparison also become immediately apparent from a consideration of the drawing. For example, it immediately becomes apparent that Company A is heavily involved in Scandinavia, the United Kingdom and Eire and has a small market share in Germany and France whereas Company B is heavily involved in the United Kingdom and Eire, Germany and France but has no involvement in Scandinavia. Likewise it becomes apparent that Company A sells only directly whereas Company B sells not only directly but also through Agents, Dealers and Distributors. It will thus be immediately apparent that the present invention provides a method and apparatus for producing comparative data in a visually assimilable form whereby an immediate visual comparison between the data represented by the first and second markings 7, 9 can be made for each area represented by a zone 3.

It will be understood that if desired further carriers carrying further markings could be overlayed over the carriers 6 and 8 to provide yet further comparative data.

The term "transparent" as used herein is meant to include any degree of transparency or translucency which will enable the zone identifying markings 4 to be viewed through the carriers and which will enable the markings 7 and 9 to combine to provide the markings 10.

Whilst the invention has been described in relation to providing comparative data relating to two different companies A and B in a visually assimilable form it will be understood that the invention has utility in any situation where a ready visual comparison of data is required. For example, the invention could be used to provide students with a ready visual comparison of the courses available at different educational establishments such as different universities and colleges or to provide doctors or other medical practitioners and/or their patients with a ready visual comparison of the facilities and specialities available at different hospitals, clinics or other medical establishments, e.g., in a particular geographical area or region. Other fields of use will no doubt become apparent and all are intended to be covered by the appended claims.

We claim:

1. A method of producing comparative data in a visually tabular assimilable form comprising the steps of:

providing a substrate which is divided into visually distinct zones arranged in tabular form and each representative of a different area of comparison and each marked with an identifying marking, said zones being arranged in a grid pattern, providing first means over said substrate comprising a first transparent carrier through which said substrate is visible marked with translucent colour markings of a first colour through which said zone identifying markings are visible, said first colour markings being aligned with at least one said zone and being indicative of first data relevant to said at least one zone, providing second means over said first means, said second means comprising a second transparent carrier through which said substrate is visible marked with translucent colour markings of a second colour through which said zone identifying markings are visible, said second colour markings being aligned with at least one said zone and being indicative of second data relevant to said at least one zone, and said first and second colour markings where they coincide in a said zone combining to produce therein a third colour different to said first and second colours, whereby to provide in tabular form an immediate visual comparison between the data represented by said first and second colour markings for each of said zones.

2. Apparatus for producing comparative data in a visually tabular assimilable form comprising:

a substrate which is divided into visually distinct zones arranged in tabular form and each representative of a different area of comparison and each marked with an identifying marking, first means over said substrate comprising a first transparent carrier through which said substrate is visible marked with translucent colour markings of a first colour through which said zone identifying markings are visible, said first colour markings being aligned with at least one said zone and being indicative of first data relevant to said at least one zone, second means over said first means, said second means comprising a second transparent carrier through which said substrate is visible marked with translucent colour markings of a second colour through which said zone identifying markings are visible, said second colour markings being aligned with at least one said zone and being indicative of second data relevant to said at least one zone, and said first and second colour markings where they coincide in a said zone combining to produce therein a third colour different to said first and second colours, whereby to provide in tabular form an immediate visual comparison between the data represented by said first and second colour markings for each of said zones.

* * * * *